Patented Sept. 29, 1942

2,296,925

UNITED STATES PATENT OFFICE 2,296,925

BLACK TRISAZO DYE

Emmet F. Hitch, Wilmington, Del., assignor to E. I. du Pont de Nemours & Company, Wilmington, Del., a corporation of Delaware No Drawing. Application December 17, 1940, Serial No. 370,477

5 Claims. (Cl. 260—171)

This invention relates to trisazo dyes which are represented by the formula A→H-acid←benzidine→Cleve's acid in which A represents one of a class of monamines of the benzene series.

The dyes of the invention have excellent affinity for animal and vegetable fibers and unexpectedly poor affinity for cellulose acetate fibers as compared to other closely related prior art trisazo dyes which give black dyeings on animal and vegetable fibers. For example, the prior art dye aniline→H-acid←benzidine → metaphenylene diamine or the dye aniline→H-acid←benzidine→ naphthylamine give a black dyeing on cotton but they stain acetate silk fibers badly because of certain compounds in the final products which are developed therein during the preparation thereof and which cannot be isolated therefrom by any process of preparing the compounds which is known to the art. It was surprising that the substitution of Cleve's acid instead of metaphenylene diamine in the first named prior art dye, or the substitution of Cleve's acid for the naphthylamine of the second of said prior art dyes would give a product having excellent affinity for cotton and practically no affinity for cellulose acetate fibers. With the new class of dyes, it is now possible to produce satisfactory black dyeings on the cotton or animal fiber portions of fabrics composed of mixtures of cellulose acetate and cotton or animal fibers. The staining produced by the prior art trisazo dyes on cellulose acetate fibers was objectionable when such fibers were not intended to be dyed. The staining was equally objectionable when cellulose acetate fibers were to be dyed, since in this case the staining of the cellulose acetate fibers gave inferior dyeings on cellulose acetate when suitable dyes were applied for dyeing the cellulose acetate portions of the fabric.

It is among the objects of the invention to provide trisazo dyes which have excellent affinity for animal and vegetable fibers and which do not deleteriously affect cellulose acetate fibers by staining. Another object of the invention is to provide trisazo dyes which dye cotton and animal fibers in black shades. A further object of the invention is to provide dyes having good fastness properties which are in general suitable for the uses to which the dyed fabrics are subjected in practice. Other objects of the invention will be apparent from the following description.

The objects of the invention are attained in general by coupling one mol equivalent of tetrazotized benzidine with one mol equivalent of H-acid. This monazo compound is coupled with one mol equivalent of a diazotized monamine of the benzene series which is represented by the formula

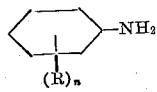

in which R is from a group consisting of hydrogen, alkyl, alkoxy, halogen, carboxy and sulfonic acid, and $n$ is an integer not greater than 3. The resulting disazo diazonium compound is then coupled with one mol equivalent of Cleve's acid, and the resulting trisazo compound is separated from the coupling medium. As the 1,6-Cleve's acid or the 1,7-Cleve's acid or mixtures of the two can be used for this purpose, the term Cleve's acid as recited in the specification and claims refers to either of the Cleve's acids or mixtures of the two.

The invention will be more fully set forth in the following more detailed description which includes examples that are given as illustrative embodiments of the invention and not as limitations thereof. Parts are expressed in parts by weight unless otherwise noted.

Example I

Benzidine sulfate paste equivalent to 9.2 parts of pure benzidine was tetrazotized in the usual manner and coupled in strong mineral acidity with H-acid paste equivalent to 16.25 parts of pure mono-sodium salt of 1-amino-8-naphthol-3,6-disulfonic acid. After stirring over night at room temperature, the temperature was lowered to 10° C., and the acidity was reduced with an aqueous solution of 5.25 parts of soda ash. Benzene diazonium chloride solution, made in the customary manner from 4.14 parts of aniline, was added, and then an aqueous solution of 12.0 parts of soda ash was added immediately. After one-half hour the temperature was 19° C., and the alkalinity that of a strong solution of sodium bicarbonate. The slight excess of benzene diazonium chloride was removed with a slightly acidic solution of H-acid paste equivalent to 0.3 part of pure mono-sodium salt of 1-amino-8-naphthol-3,6-disulfonic acid. An aqueous slurry of mixed Cleve's acids equivalent to somewhat more than 11.2 parts of a mixture of pure 1-naphthylamine-6-sulfonic acid and 1-naphthylamine-7-sulfonic acid was added, and the coupling allowed to take place while stirring over night. Salt was then added until the dyestuff could be isolated by filtration at room temperature.

A yield of sixty parts of dry crude dye was obtained. This product dyed cotton a desirable shade of black, and stained cellulose acetate attached to the cotton but very slightly, being much superior in this latter respect as compared to a dye made in an analogous fashion, with the exception that meta-phenylene diamine was substituted for the mixed naphthylamine sulfonic acids. The product is considerably superior to the dye para-phenylene diamine→H-acid←benzidine→(mixture of 1-naphthylamine-6-sulfonic acid and 1-naphthylamine-7-sulfonic acid), and the corresponding dyes containing mono-acetyl para-phenylene diamine or para-nitro-aniline in the place of para-phenylene diamine.

*Example II*

A dye made exactly as that described in Example I, with the exception that 1-naphthylamine-6-sulfonic acid was used instead of mixed Cleve's acid, had dyeing properties essentially the same as those of the product obtained by the process of Example I.

*Example III*

A dye made exactly as that described in Example I, with the exceptions that the diazonium chloride was made in the usual manner from 5.68 parts of para-chloroaniline instead of aniline, and 1-naphthylamine-7-sulfonic acid was used instead of mixed Cleve's acid, had dyeing properties essentially the same as those of the product obtained by the process of Example I. The same results were obtained by using the mixed Cleve's acid of Example I instead of 1,7-Cleve's acid.

*Example IV*

A dye made exactly as that described in Example I, with the exception that the daizonium chloride was made in the usual manner from 7.21 parts of 2,5-dichloroaniline instead of aniline had dyeing properties essentially the same as those of the product obtained by the process of Example I.

*Example V*

A dye made exactly as that described in Example I, with the exception that the diazonium chloride was made in the usual manner from 8.51 parts of sulfanilic acid instead of aniline dyed cotton a bluer shade of black than did the product obtained by the process of Example I. The non-staining properties of this dye toward cellulose acetate were similar to that of the product of Example I.

The class of arylamines of the benzene series which may be utilized in making the compounds having the desired properties is represented in the foregoing formula. As other illustrations of these compounds are mentioned ortho-, meta- and para-toluidine, meta- and para-xylidine, metanilic acid, ortho- and meta-chloro-aniline, aniline- 2,5-disulfonic acid, 4-n-hexylaniline, mesidine, anthranilic acid, aniline-2,5-dicarboxylic acid, o-anisidine, cresidine, 3-bromo-4-methyl-aniline-5-sulfonic acid, 3-bromo-4-carboxy-aniline-5-sulfonic acid, 2-hexyl-5-bromo-aniline-3-sulfonic acid and 3-butyl aniline.

No variation in the last component can be made other than a choice between the Cleve's acids or a mixture thereof, each of which is substantially the equivalent of the others.

As will be apparent to those skilled in the art, variations in the pH values and temperatures of the coupling media may be made so long as the essential alkaline or acid nature of the several media are adhered to.

From the foregoing disclosure it will be recognized that the invention is susceptible of modification without departing from the spirit and scope thereof and it is to be understood that the invention is not restricted to the specific illustrations thereof herein set forth.

I claim:

1. A dye represented by the formula

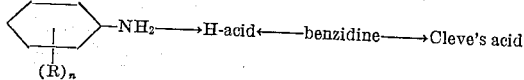

in which R is from a group consisting of hydrogen, alkyl having 1 to 6 carbons, the corresponding alkoxy groups, halogen, carboxy and sulfonic acid; and $n$ is 1 to 3.

2. A dye represented by the formula aniline→H-acid←benzidine→mixed Cleve's acid.

3. A dye represented by the formula para chloraniline→H-acid←benzidine→mixed Cleve's acid.

4. A dye represented by the formula sulfanilic acid→H-acid←benzidine→mixed Cleve's acid.

5. The process of making a black trisazo dye which comprises coupling one part of tetrazotized benzidine in acid coupling medium with 1 part of H-acid; coupling the monazo compound thus produced in alkaline medium with the diazo of a primary arylamine represented by the formula

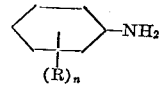

in which $n$ is 1 to 3 and R is from a group consisting of hydrogen, alkyl having 1 to 6 carbons, the corresponding alkoxy groups, halogen, carboxyl and sulfonic acid; and then coupling the disazo compound thus produced with a Cleve's acid in alkaline medium.

EMMET F. HITCH.